Feb. 16, 1943.　　T. G. SCHMEISER　　2,311,475
AUXILIARY TRACTION WHEEL
Filed Sept. 19, 1941　　2 Sheets-Sheet 1

INVENTOR
T. G. Schmeiser
BY
ATTYS

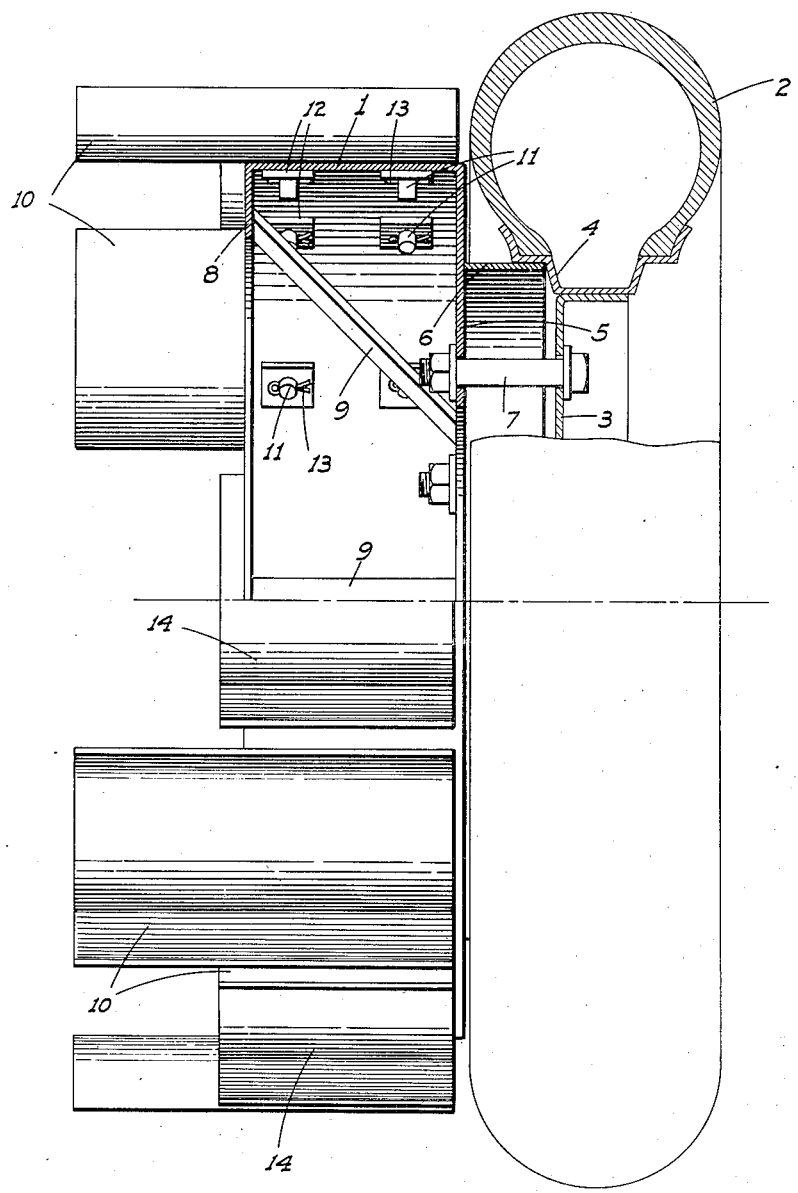

Patented Feb. 16, 1943

2,311,475

UNITED STATES PATENT OFFICE 2,311,475

AUXILIARY TRACTION WHEEL

Theodore G. Schmeiser, Fresno, Calif.

Application September 19, 1941, Serial No. 411,482

3 Claims. (Cl. 301—44)

This invention relates in general to a wheel structure for agricultural implements and in particular is directed to, and it is my principal object to provide, an auxiliary traction wheel of unique construction; such auxiliary traction wheel being adapted for detachable connection with the conventional traction wheels of the implement.

Another object of the invention is to provide an auxiliary traction wheel designed particularly for use with pneumatic tired wheels of harvesters or the like. In harvesting rice, for example, the harvester must often enter the field and begin operations while the earth is wet and soft. In many such instances the conventional wheels of the tractor cannot negotiate the wet, soft fields, the tires either miring or the tread portions filling with mud, reducing traction to a minimum, which is undesirable.

A further object of the invention is to provide an auxiliary traction wheel which embodies a novel form of traction cleat; the wheel including a plurality of such cleats and the latter being mounted for loose play movement in a direction circumferentially of the wheel in order to secure a maximum of traction under wet and soft soil conditions.

It is also an object of the invention to provide the traction cleats of the auxiliary wheel with detachable traction lugs adapted for placement and use under extreme conditions; such lugs being readily removable from the auxiliary wheel when not needed.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a transverse elevation of the auxiliary traction wheel mounted for use; the view being one-half in section.

Figure 1:
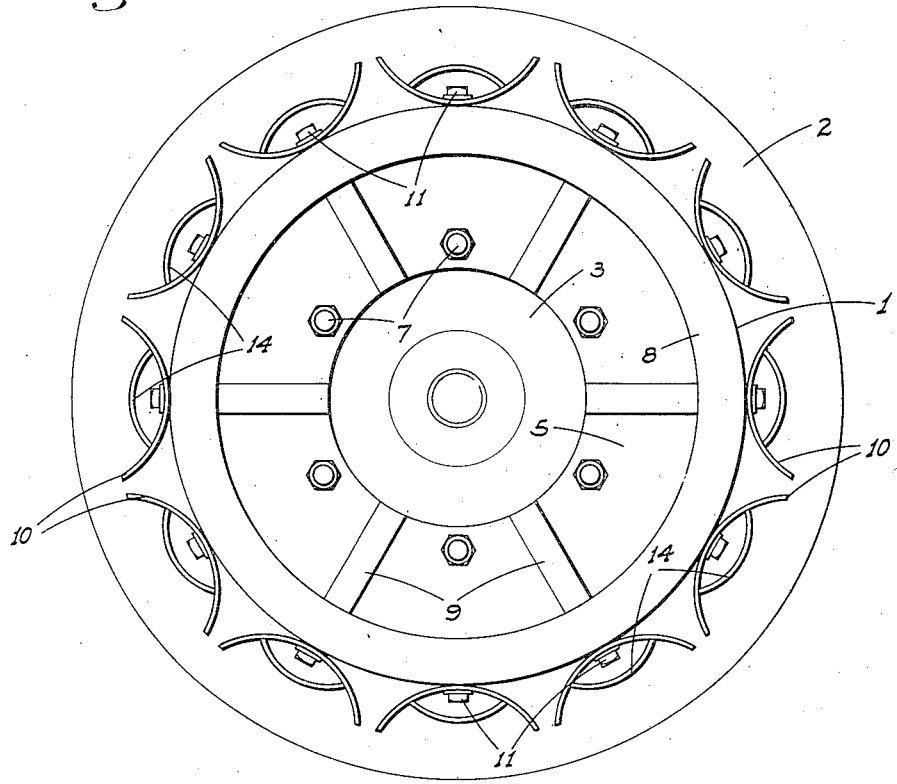
Figure 1 is a face elevation of the auxiliary traction wheel as mounted on one of the conventional wheels of an implement.
Figure 3:
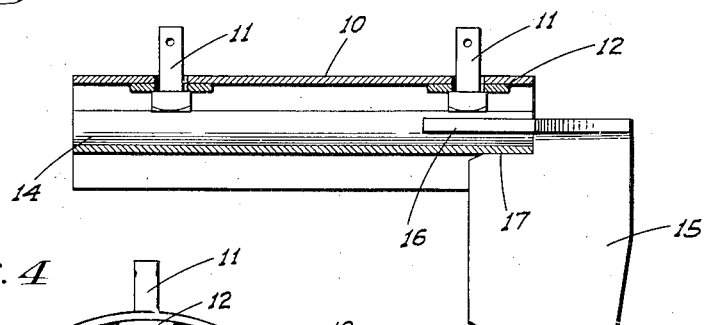
Figure 3 is a sectional elevation of one of the traction cleats with the attachment lug in place thereon.
Figure 4:
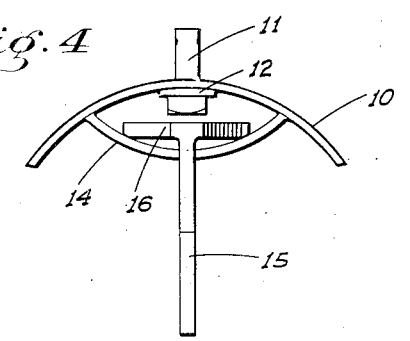
Figure 4 is an end view of one of the traction cleats with one of the attachment lugs secured thereto.

Referring now more particularly to the characters of reference on the drawings, my improved auxiliary traction wheel comprises a supporting band or drum 1 having a relatively wide transverse face; such drum being of a diameter somewhat less than the tread portion of tire 2 of the conventional implement wheel 3 to which the auxiliary structure is to be attached, but is of greater diameter than the rim 4 of such wheel.

The drum 1 is formed with a circular back plate 5 of substantial radial extent which projects inwardly from the inner edge of the drum. An annular flange 6 is formed on the back plate 5 some distance radially inwardly of drum 1 and projects axially and rearwardly for seating engagement with the drop center portion and in face abutment with the underside of the tire bead flange of the rim 4 of the implement wheel 3. When flange 6 is so seated, the drum 1 extends horizontally outward from a point quite close to but clear of the tire 2. Circumferentially spaced tie bolts 7 or the like connect between wheel 3 and back plate 5, detachably securing the auxiliary traction wheel in place.

A relatively narrow circular flange 8 extends radially inwardly from the outer edge of drum 1, and circumferentially spaced braces 9 extend diagonally from flange 8 in the direction of the drum axis, and at their inner ends are secured to the back plate 5 adjacent its inner periphery.

A plurality of elongated, transversely arcuate traction cleats 10 are seated on the drum 1 in circumferentially spaced relation and parallel to the drum axis; these track cleats being disposed with their concave faces outermost. Alternate ones of said track cleats are substantially elongated and project some distance beyond the outer edge of the drum and the outer ends of the intermediate cleats.

Each of the traction cleats 10 is secured to the drum 1 by means of a pair of bolts 11 spaced lengthwise of the cleat and passing through the cleat and drum in loose play relation thereto. Suitable washers 12 engage about the bolts beneath the head and about the shanks of the bolts inwardly of the drum; the bolts being held against escape by cotter keys 13. By reason of the loose play of bolts 11, the transversely arcuate cleats 10 have considerable play or can rock circumferentially of the auxiliary traction wheel; this loose play or rocking assuring that the cleats follow ground contours which substantially increases traction.

Each of the traction cleats 10 is provided with a rigid bridge plate 14 which extends from end to end of the cleat some distance inwardly of its outer edges; such bridge plate being arcuate in section and convex on its outer face. These bridge plates assure against wet earth packing into the traction cleats 10.

Under extreme wet and soft soil conditions, I provide a number of detachable lugs, adapted to be mounted in connection with the cleats 10; these lugs comprising lug plates 15 which are disposed on edge radially of the drum and project axially and also radially outward from the outer ends of the cleats 10 to which they are attached. The lug plates 15 are attached to the cleats 10 by the following means:

The radially inner edge of each lug plate 15 is provided with a tongue 16 disposed at right angles to said plate, said tongue being of a length to project beyond the laterally inner edge of the plate. The plate is notched inwardly from said edge and immediately adjacent said tongue, as at 17, the notch flaring at its end as at 18 to facilitate initial engagement with the bridge plate of the corresponding cleat.

The width of plate 16 and the radial depth of notch 17 are so related to the curvature of bridge plate 14 that when the tongue is driven into the space between the cleat and bridge plate, the side edges of the tongue will frictionally engage the radially inner face of the bridge plate, while the radially outer edge of the notch frictionally engages the radially outer face of the bridge plate in holding relation. The bridge plate is slightly sprung by the driving-in operation, so that a tight fit is assured.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a traction wheel which includes a drum and a plurality of circumferentially spaced cleats secured transversely thereto; said cleats being arcuate in cross section and disposed with their concave faces outermost, and bridge plates extending from end to end of the cleats and connected between the sides thereof some distance radially inwardly of their edges.

2. In a traction wheel which includes a drum and a plurality of circumferentially spaced cleats secured transversely thereto; said cleats being arcuate in cross section and disposed with their concave faces outermost, and bridge plates extending from end to end of the cleats and connected between the sides thereof some distance radially inwardly of their edges, said bridge plates being arcuate in cross section and having their convex faces outermost.

3. In combination with a traction wheel cleat which includes a transversely extending plate arcuate in cross section and disposed with one end exposed; an attachment lug comprising a lug plate on edge radially of the wheel disposed at and intersecting said one end of the arcuate cleat plate, and a tongue of substantial width on and extending along the radially inner edge of the lug plate and projecting in rigid relation laterally some distance on opposite sides thereof, said lug plate being notched inwardly a substantial distance from the edge adjacent said one end of the cleat plate and adjacent said tongue; said attachment lug being releasably but drive fitted on the cleat plate with the portion of the latter adjacent said one end and intermediate its edges extending into the notch in holding relation, the corresponding portion of the tongue frictionally engaging and bridging a portion of the concave face of said cleat plate.

THEODORE G. SCHMEISER.